US009122020B2

(12) United States Patent
Haley et al.

(10) Patent No.: US 9,122,020 B2
(45) Date of Patent: Sep. 1, 2015

(54) CONNECTOR ASSEMBLY HAVING A SLIDABLE CONNECTOR

(75) Inventors: Edmund Joseph Haley, Dillsburg, PA (US); David Robert Baechtle, Dillsburg, PA (US); Robert C. Briggs, New Bloomfield, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 473 days.

(21) Appl. No.: 13/490,263

(22) Filed: Jun. 6, 2012

(65) Prior Publication Data

US 2013/0330957 A1 Dec. 12, 2013

(51) Int. Cl.
 *G02B 6/38* (2006.01)
 *H01R 12/91* (2011.01)
 *H01R 13/631* (2006.01)
 *G02B 6/42* (2006.01)

(52) U.S. Cl.
 CPC ............ *G02B 6/3825* (2013.01); *G02B 6/3897* (2013.01); *G02B 6/4261* (2013.01); *H01R 12/91* (2013.01); *H01R 13/6315* (2013.01); *G02B 6/3893* (2013.01); *G02B 2006/4297* (2013.01)

(58) Field of Classification Search
 CPC ........................... H01R 13/6315; H01R 12/91
 USPC ................................. 439/246–248
 See application file for complete search history.

(56) References Cited

U.S. PATENT DOCUMENTS

| 5,348,487 | A | 9/1994 | Marazzi et al. |
| 5,363,460 | A | 11/1994 | Marazzi et al. |
| 5,537,501 | A * | 7/1996 | Iwano et al. ............... 385/59 |
| 5,716,224 | A | 2/1998 | Masuda et al. |
| 5,953,473 | A * | 9/1999 | Shimotsu et al. ......... 385/56 |
| 6,461,053 | B1 | 10/2002 | Mayercik et al. |
| 6,485,192 | B1 | 11/2002 | Plotts et al. |
| 6,585,423 | B1 | 7/2003 | Vergeest |
| 6,776,533 | B2 * | 8/2004 | Gherardini ............... 385/59 |
| 7,073,953 | B2 | 7/2006 | Roth et al. |
| 2002/0118926 | A1 | 8/2002 | Shimoji et al. |
| 2012/0039569 | A1 | 2/2012 | Kevern et al. |

FOREIGN PATENT DOCUMENTS

| EP | 0430107 A2 | 6/1991 |
| EP | 0613030 A2 | 8/1994 |
| GB | 2325309 A | 11/1998 |

OTHER PUBLICATIONS

International Search Report, International Application No. PCT/US2013/044457, International Filing Date Jun. 6, 2013.

* cited by examiner

*Primary Examiner* — Felix O Figueroa

(57) ABSTRACT

A connector assembly including an outer housing having a front end, a back end, and a central axis extending therebetween. The outer housing has a passage that extends therethrough. The connector assembly also includes a slidable connector that is disposed within the passage. The slidable connector includes a communication module. The connector assembly also includes a spring frame that is positioned between the slidable connector and the outer housing. Prior to mating with a mating connector, the spring frame mechanically couples the slidable connector with respect to the outer housing. After the mating connector and the communication module are communicatively coupled, the spring frame releases the slidable connector from the outer housing such that the slidable connector is permitted to move relative to the outer housing. The spring frame mechanically couples the slidable connector relative to the mating connector.

20 Claims, 13 Drawing Sheets

CONNECTOR ASSEMBLY HAVING A SLIDABLE CONNECTOR

BACKGROUND OF THE INVENTION

The subject matter described and/or illustrated herein relates generally to a connector assembly having a floatable connector that is configured to engage a mating connector.

Connector systems can include a first connector that is configured to mate with a second connector. The connectors may be electrical and/or optical connectors. Optical connectors are configured to interconnect different optical fibers in a manner that maintains the transmission of light signals through the interconnection. For example, an optical connector may mechanically couple and align the cores of different optical fibers so that the light signals can be transmitted between the optical fibers. Optical connectors may include ferrules that hold the ends of the optical fibers. Each ferrule is configured to align with and engage another ferrule to establish an optical coupling. To maintain the optical coupling throughout operation, biasing mechanisms (e.g., coil springs) may be used to provide a constant residual force that presses the optically-coupled ferrules together.

An electrical connector includes at least one electrical contact that is configured to mechanically and electrically engage corresponding contact(s) of another connector. When two electrical connectors are mated together, biasing mechanisms similar to those described above may be used to maintain the engagement between the two mated electrical connectors.

However, current electrical and optical connector systems may have undesirable limitations or complexities. For example, optically-coupled ferrules may face each other along a mating axis (or z-axis). In some known optical connector systems, the ferrules are permitted to move only a limited amount (e.g., about 1-2 millimeters) from each other along the mating axis. As another example, electrical and optical connector systems may include a backplane circuit board that extends orthogonal (i.e., perpendicular) to the mating axis of the connector system. At least one of the connectors may be mounted to the backplane circuit board. However, the residual forces provided by the above-described biasing mechanisms may provide unwanted stress on the backplane circuit board, which may cause the backplane circuit board to bend or warp during its operating lifetime. In some cases, it may be necessary to use additional components, such as board stiffeners, to counteract the residual stresses.

Accordingly, there is a need for a connector assembly that permits a greater amount of axial movement than known connector assemblies and/or reduces the stresses experienced by various components of the connector assembly or connector system.

BRIEF DESCRIPTION OF THE INVENTION

In one embodiment, a connector assembly is provided that includes an outer housing having a front end, a back end, and a central axis extending therebetween. The outer housing has a passage that extends therethrough. The connector assembly also includes a slidable connector that is disposed within the passage. The slidable connector includes a communication module for communicatively coupling to a mating connector during a mating operation to transmit at least one of data signals or power. The connector assembly also includes a spring frame that is positioned between the slidable connector and the outer housing. Prior to the mating operation, the spring frame mechanically couples the slidable connector with respect to the outer housing. After the mating connector and the slidable connector engage each other, the spring frame releases the slidable connector from the outer housing such that the slidable connector is permitted to move relative to the outer housing. The spring frame mechanically couples the slidable connector relative to the mating connector.

In another embodiment, a connector assembly is provided that includes an outer housing having a front end, a back end, and a central axis extending therebetween. The outer housing has a passage that extends therethrough. The connector assembly also includes a slidable connector that is disposed within the passage. The slidable connector includes a communication module for communicatively coupling to a mating connector during a mating operation to transmit at least one of data signals or power. The connector assembly also includes a retaining latch that is positioned between the slidable connector and the outer housing. Prior to the mating operation, the retaining latch mechanically couples the slidable connector to the outer housing to prevent movement of the slidable connector in a first direction along the central axis. During the mating operation, the retaining latch is engaged by the mating connector thereby releasing the slidable connector from the outer housing. The slidable connector is permitted to move along the central axis within the passage during the mating operation.

In one embodiment, a connector assembly is provided that includes an outer housing having a front end, a back end, and a central axis extending therebetween. The outer housing has a passage that extends therethrough. The connector assembly also includes a slidable connector that is disposed within the passage. The slidable connector includes a communication module for communicatively coupling to a mating connector during a mating operation to transmit at least one of data signals or power. The connector assembly also includes a coupling latch that is attached to the slidable connector and positioned in the passage between the slidable connector and the outer housing. The coupling latch is configured to flex relative to the slidable connector when a projecting arm of the mating connector engages the coupling latch while moving in a first direction. After the projecting arm is permitted to pass the coupling latch, the coupling latch is configured to engage the projecting arm when the mating connector is pulled in a second direction that is opposite the first direction. The coupling latch is configured to hold the slidable connector in a stationary position relative to the mating connector.

DETAILED DESCRIPTION OF THE INVENTION

Figure 1:
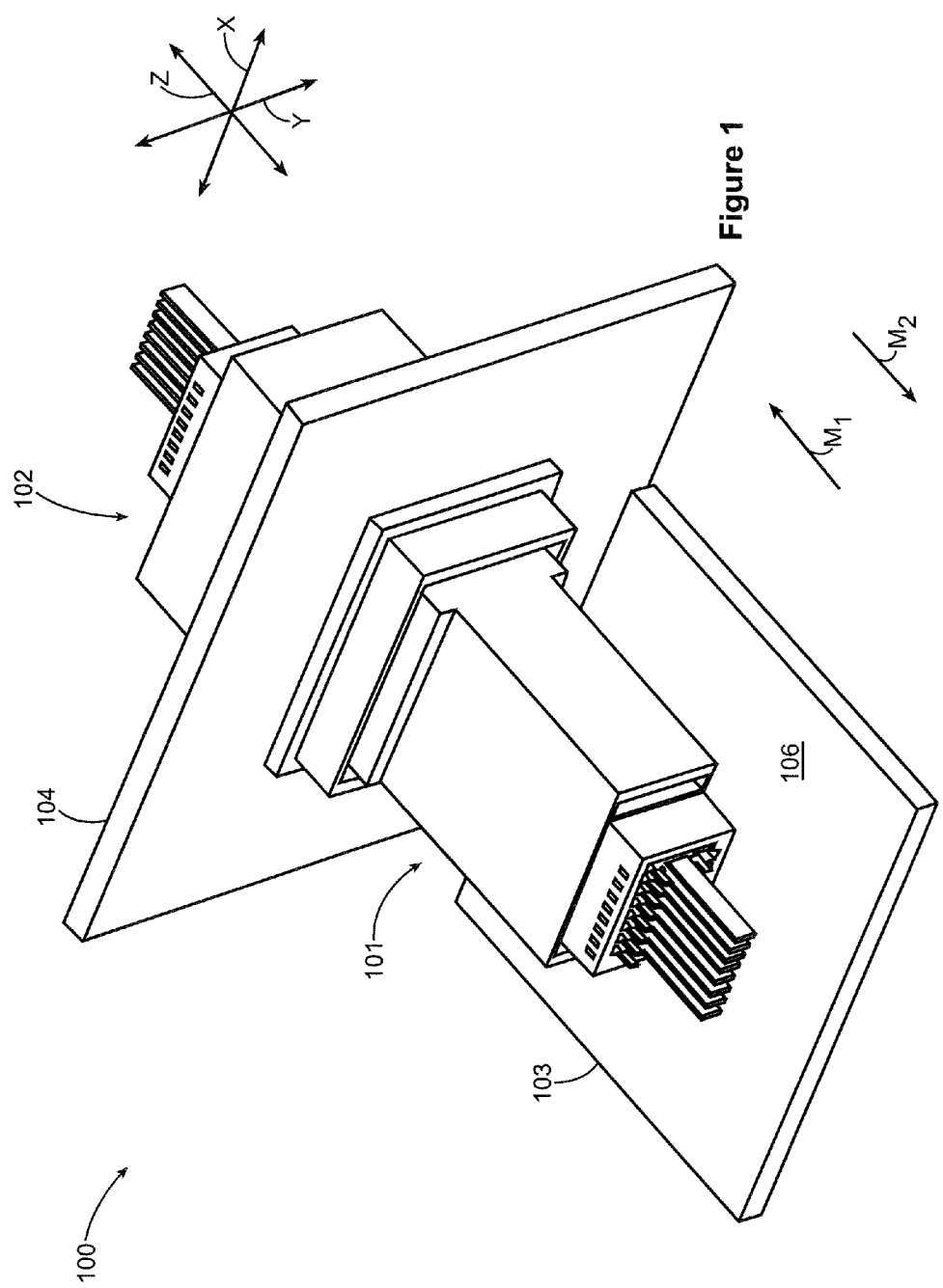
FIG. 1 is a perspective view of a connector system formed in accordance with one embodiment.

FIG. 1 is a perspective view of a connector system 100 formed in accordance with one embodiment. As shown, the connector system 100 is oriented with respect to mutually perpendicular x-, y-, and z-axes. The connector system 100 includes first and second connector assemblies 101, 102 that are mounted to first and second circuit boards, 103, 104, respectively. In some embodiments, the circuit board 103 may be characterized as a daughter card, and the circuit board 104 may be characterized as a backplane circuit board. The first circuit board 103 extends parallel to a plane defined by the x- and z-axes (also called the xz-plane), and the second circuit board 104 extends parallel to a plane defined by the x- and y-axes (also called the xy-plane). Accordingly, the first and second circuit boards 103, 104 are oriented orthogonal to each other in the illustrated embodiment. However, it should be noted that the connector system 100 illustrated in FIGS. 1-16 is only exemplary and various modifications may be made. For example, the first and second circuit boards 103, 104 may be coplanar (e.g., edge-to-edge) or extend parallel to each other. In other embodiments, the connector system 100 does not utilize circuit boards. For instance, the first and second connector assemblies 101, 102 may be mounted to sheet metal, plastic, or any other material that can support the connector assemblies.

As shown, the connector assembly 101 is mounted to a board surface 106 of the circuit board 103 and faces in a first direction $M_1$ along the z-axis. In the illustrated embodiment, the connector assembly 101 is only secured or affixed to the circuit board 103. However, in other embodiments, the connector assembly 101 may be communicatively coupled to the circuit board such that, for example, data signals are transmitted through the connector assembly 101 and the circuit board 103. The board surface 106 extends parallel to the xz-plane.

The connector assembly 102 faces in a second direction $M_2$ along the z-axis, which is opposite the first direction $M_1$. The connector assembly 102 extends through an opening of the circuit board 104 such that a portion of the connector assembly 102 and the connector assembly 101 are on a common side of the circuit board 104. However, the connector assembly 102 may not extend through an opening of the circuit board in other embodiments.

In an exemplary embodiment, the connector assemblies 101, 102 are optical connector assemblies configured to transmit optical data signals (or fiber-optic signals) through the connector system 100 when the connector assemblies 101, 102 are mated to each other. By way of example only, the connector system 100 and the connector assemblies 101, 102 described herein may be similar to the LIGHTRAY® MIX product line marketed by TE Connectivity. However, in other embodiments, the connector assemblies 101, 102 may be electrical connector assemblies that are configured to transmit electrical data signals and/or power through the connector system 100. Accordingly, embodiments described herein may be configured to transmit at least one of data signals (optical or electrical) or power.

It should be noted that FIGS. 1-16 are only exemplary and that the connector system 100 and the connector assemblies 101, 102 may have other configurations and/or may be part of various other types of components, systems, and assemblies in other embodiments. For example, in another configuration, the connector assembly 102 may be mounted to a chassis or panel instead of a backplane circuit board. In other embodiments, the connector assembly 102 is not mounted to a circuit board or to a chassis but is a stand-alone connector assembly at an end of a cable. Likewise, the connector assembly 101 may be mounted to other supports instead of a daughter card or may be a stand-alone connector assembly at a cable end.

Figure 2:
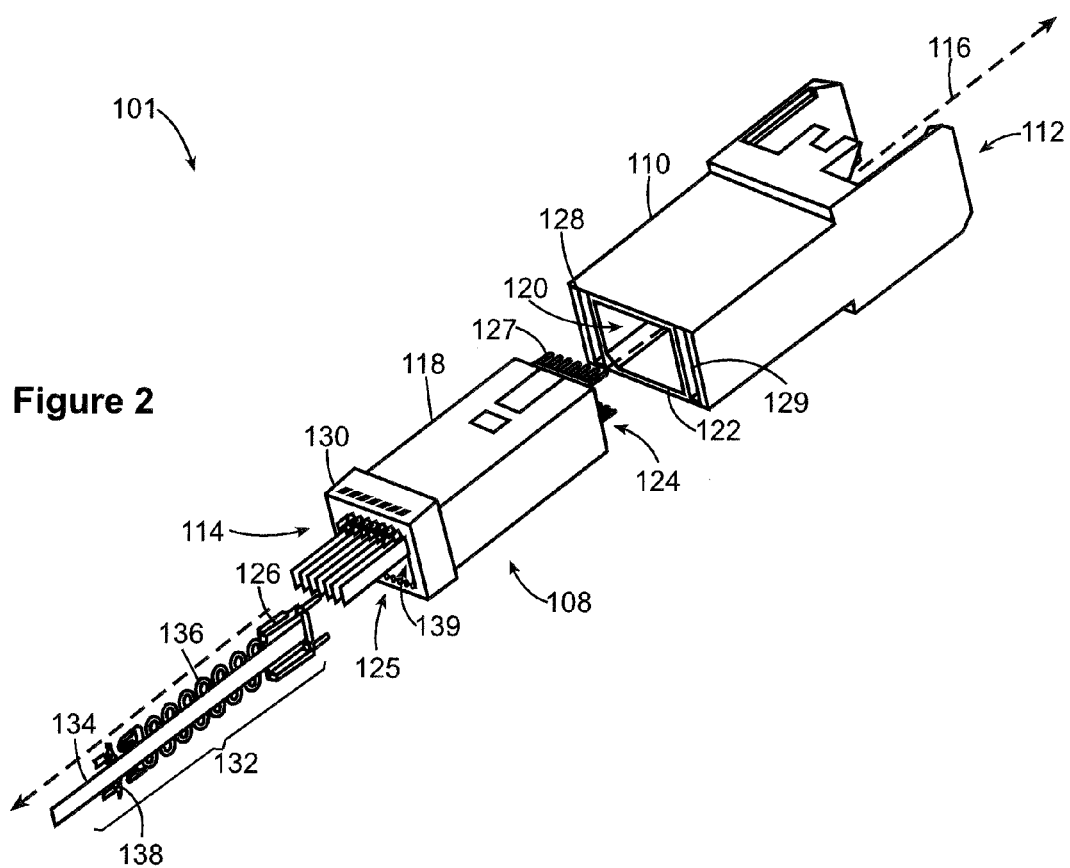
FIG. 2 is an exploded view of a first connector assembly formed in accordance with one embodiment.

FIG. 2 is a partially exploded view of the connector assembly 101. As shown, the connector assembly 101 includes an assembly housing 110 and a module connector 108. The connector assembly 101 has a leading end 112, a trailing end 114, and a central axis 116 that extends therebetween. During a mating operation between the connector assembly 101 and the connector assembly 102 (FIG. 1), the central axis 116 is oriented parallel to the z-axis (FIG. 1).

The assembly housing 110 includes a passage 120 that extends through the assembly housing 110 along the central axis 116 between the leading and trailing ends 112, 114 when the connector assembly 101 is constructed. The passage 120 is sized and shaped to receive the module connector 108. The passage 120 may be accessed from an exterior space through either of the leading and trailing ends 112, 114. For example, the module connector 108 is configured to be inserted into the passage 120 through an opening 122 at the trailing end 114. Also shown, the assembly housing 110 includes channels 128, 129 that are located on opposite sides of the passage 120 and extend parallel to the passage 120. The channels 128, 129 are open to the exterior at the leading end 112 and at the trailing end 114.

The module connector 108 has a mating face 124 and a loading end 125. The module connector 108 includes an insert plug or housing 118 that is configured to hold at least one communication module 126. In alternative embodiments, the housing 118 is not used and the communication module 126 is inserted directly into the passage 120 of the assembly housing 110. In the illustrated embodiment, a series of communication modules 126 are positioned side-by-side in the insert plug 118. The communication modules 126 may also be referred to as ferrules in some embodiments. The communication modules 126 are configured to engage other communication modules, which is described in greater detail below, at the mating face 124 thereby establishing a communicative coupling such that data signals and/or power can be transmitted between the coupled communication modules. In alternative embodiments where the housing 118 is not used and the communication module 126 is inserted directly into the passage 120 of the assembly housing 110, the communication modules 126 are configured to engage other communication modules proximate to the leading end 112. To this end, each of the communication modules 126 may include one or more guide pins 127 that are configured to be received by cavities of another communication module.

Although not shown in detail, each of the communication modules 126 may include an array of optical fibers ends and a corresponding lens array that is configured to collect and collimate or focus light from the optical fibers. The lens array may project light from the optical fiber ends. In other embodiments, the fiber ends of the communication modules 126 and the fiber ends of the other communication modules with which the communication modules 126 are configured to engage may directly contact each other end-to-end. However, the communication module 126 can be other types of optical modules in other embodiments, or the communication module 126 can be an electrical module having one or more electrical contacts. Furthermore, embodiments described herein may include only one communication module instead of a plurality of communication modules.

In the illustrated embodiment, the insert plug 118 includes a plurality of open-ended slots 130 that extend lengthwise parallel to the central axis 116 between the mating face 124 and the loading end 125. Each of the communication modules 126 may be part of a corresponding module assembly 132 that includes the communication module 126, a fiber-optic cable 134, and a biasing element 136. The fiber-optic cable 134 is attached to the communication module 126. The biasing element 136 is configured to engage the communication module 126 and provide a force that resists movement of the communication module 126 in a predetermined direction. In an exemplary embodiment, the biasing element 136 includes a spring that wraps back-and-forth within a plane. In alternative embodiments, the biasing element 136 may be other types of springs (e.g., coil springs) or other elements/components capable of providing a resilient force (e.g., flexible fingers). Each of the module assemblies 132 is configured to be inserted into a corresponding slot 130.

The biasing elements 136 include corresponding fingers 138 that are configured to be inserted into the corresponding slot 130 and positioned in front of positive stops 139 of the insert plug 118. The positive stops prevent the biasing elements 136 from being pushed out of the insert plug 118 and, consequently, cause the biasing elements 136 to be compressed in the corresponding slots 130 when a force is applied to the communication modules 126 at the mating face 124. The biasing elements 136 may be preloaded in the corresponding slots 130 such that the biasing elements 136 press against the corresponding positive stops and the communication modules 126. In alternative embodiments, a cap (not shown) may be fixed to the loading end 125 of the insert plug 118. The cap may function as a positive stop that prevents the biasing elements 136 from being displaced.

Figure 3:
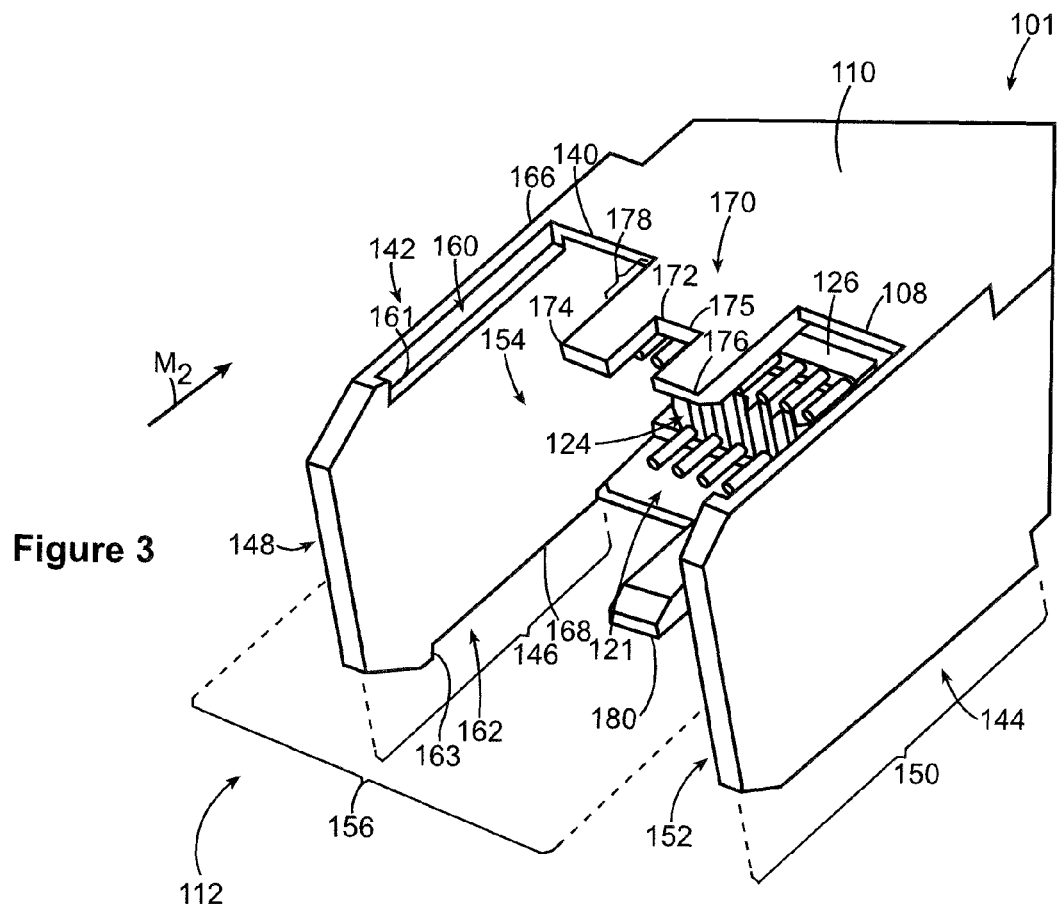
FIG. 3 is a perspective view of a leading end of the connector assembly.

FIG. 3 is a perspective view of the leading end 112 of the connector assembly 101 after the connector assembly 101 is constructed. The assembly housing 110 may include front edges 140, 141 proximate to where the mating face 124 of the module connector 108 is positioned. The front edges 140, 141 may be coincident with an opening 121 to the passage 120 (FIG. 2). The communication modules 126 may be located proximate to the opening 121. In the illustrated embodiment, the ends of the communication modules 126 are approximately flush with the front edges 140, 141. However, in other embodiments, the ends of the communication modules 126 may extend beyond the front edge 140 or, alternatively, be located a depth within the passage 120. The assembly housing 110 also includes projecting arms 142, 144 that extend lengthwise along (e.g., parallel to) the central axis 116 (FIG. 2) from the front edges 140, 141. The projecting arm 142 extends a length 146 from the front edges 140, 141 to a leading edge 148, and the projecting arm 144 extends a length 150 from the front edge 140 to a leading edge 152. In an exemplary embodiment, the lengths 146, 150 are different. For example, the length 146 may be longer than the length 150. However, in alternative embodiments, the lengths 146, 150 are equal. In other embodiments, the connector assembly 101 has only one projecting arm.

The projecting arms 142, 144 may define a connector-receiving space 154 between the projecting arms 142, 144. The connector-receiving space 154 has a width 156 that is sized to receive a portion of the connector assembly 102 (FIG. 1) during the mating operation. In the illustrated embodiment, the projecting arms 142, 144 are sidewalls that extend along (e.g. parallel to) the zy-plane (FIG. 1) and define one dimension (e.g., height) of the connector assembly 101. As shown, the projecting arm 142 includes grooves 160, 162 that extend parallel to the central axis 116 proximate to corresponding longitudinal edges 166, 168 of the projecting arm 142. The grooves 160, 162 end at corresponding engagement surfaces 161, 163. The engagement surfaces 161, 163 substantially face in the second direction $M_2$. As will be described in greater detail below, the engagement surfaces 161, 163 may operate as positive stops when the connector assemblies 101, 102 are mated to each other. Although not shown in detail, the projecting aim 144 may also include a pair of grooves with corresponding engagement surfaces.

Also shown in FIG. 3, the leading end 112 of the connector assembly 101 includes an actuator 170 that projects away from the front edge 140 along the central axis 116. The actuator 170 includes a forward-facing actuator edge 172 that defines a pair of projections 174, 176 and a notch 175 therebetween. The actuator edge 172 along the notch 175 extends a length 178 away from the front edge 140. Also shown in FIG. 3, the leading end 112 may include another actuator 180 that extends away from the front edge 141. The actuator 180 opposes the actuator 170 with the connector-receiving space 154 therebetween. The actuator 180 may also include projections and a notch as described with respect to the actuator 170. In some embodiments, the connector assembly 101 includes only one actuator.

Figure 4:
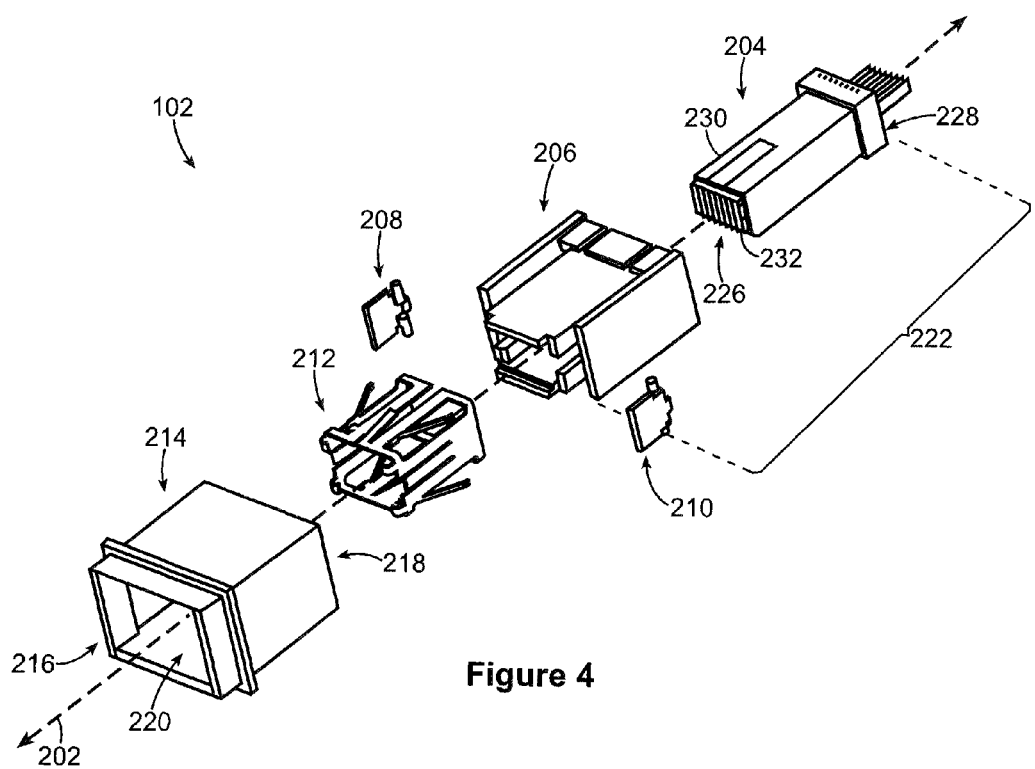
FIG. 4 is an exploded view of a second connector assembly formed in accordance with one embodiment.

FIG. 4 is an exploded view of the connector assembly 102. The different components of the connector assembly 102 are aligned with respect to one another along a central axis 202. The connector assembly 102 includes a module connector 204, a housing insert 206, a pair of shutters 208, 210, a spring frame 212, and an outer housing 214. The outer housing 214 includes a front end 216 and a back end 218 and has the central axis 202 extending therebetween. The outer housing 214 includes a passage 220 that extends therethrough between the front and back ends 216, 218. However, it should be noted that the connector assembly 102 shown in the Figures is only exemplary and various modifications may be made. For example, in some embodiments, the connector assembly 102 includes only one shutter or does not use any shutters. In some embodiments, the various features of the spring frame 212 (described below) may be incorporated into the housing insert 206.

The module connector 204 and the housing insert 206 may be connected together to form a slidable or floatable connector 222. The slidable connector 222 is configured to be disposed within the passage 220 having the spring frame 212 located between the slidable connector 222 and the outer housing 214. The slidable connector 222 is configured to move in the passage 220 at least along the central axis 202. When the connector assembly 102 is used in the connector system 100 (FIG. 1), the central axis 202 extends parallel to the z-axis (FIG. 1). In the illustrated embodiment, the spring frame 212 is affixed to the slidable connector 222.

The module connector 204 may be similar to the module connector 108 (FIG. 2) described herein. For example, the module connector 204 may have a mating face 226 and a loading end 228. The module connector 204 includes an insert plug or housing 230 that is configured to hold at least one communication module 232. Optionally, a plurality of communication modules 232 may be positioned side-by-side in a series as shown in FIG. 4. The communication modules 232 are configured to engage the communication modules 126 (FIG. 2) at the mating face 226 thereby establishing a communicative coupling between communication modules 232, 126. Like the communication modules 126, each of the communication modules 232 may include an array of optical fibers ends and a corresponding lens array that is configured to collect and collimate or focus light from the optical fibers. The lens array may project light from the optical fiber ends. In other embodiments, the fiber ends of the communication modules 232 and the fiber ends of the communication modules 126 (FIG. 2) directly contact each other end-to-end. Moreover, each of the communication modules 232 may be part of a module assembly (not shown) that is similar or identical to the module assembly 132 shown in FIG. 2. For example, the module assembly may include a fiber-optic cable and a biasing element as described herein.

Figure 5:
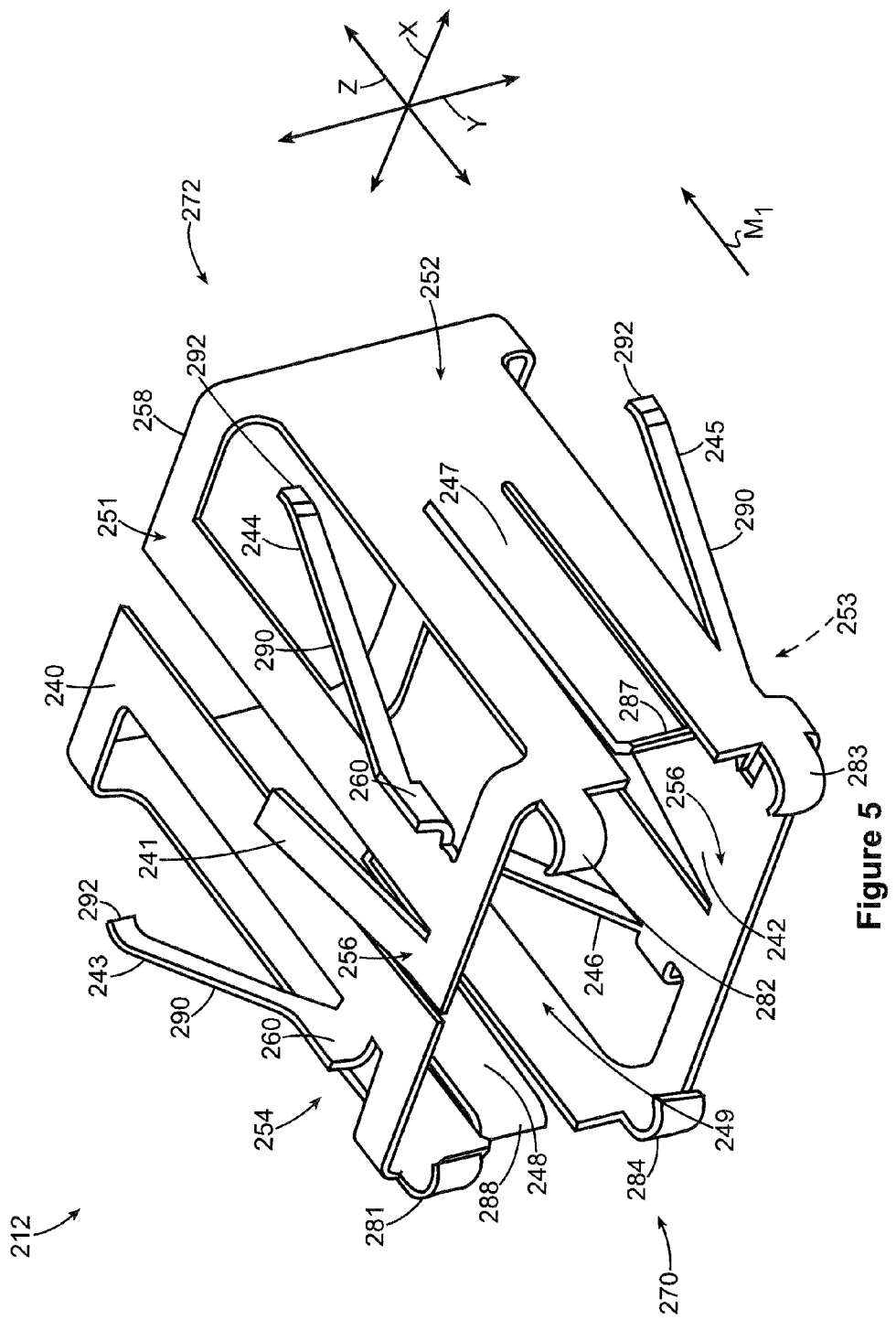
FIG. 5 is a perspective view of a spring frame that may be used with the second connector assembly of FIG. 4.

FIG. 5 is a perspective view of the spring frame 212. The spring frame 212 may include a frame body 240 having a plurality of resilient flex elements 241-248. The frame body 240 is configured to wrap around a portion of the housing insert 206 (FIG. 4) so that the spring frame 212 is disposed between the slidable connector 222 (FIG. 4) and the outer housing 214 (FIG. 4). The flex elements 241-248 are configured to engage at least one of the outer housing 214, the shutters 208, 210 (FIG. 4), or the assembly housing 110 (FIG. 2) of the connector assembly 101 (FIG. 1). The flex elements 241-248 include retaining latches 241, 242, coupling latches 243-246, and biasing fingers 247, 248, which may also be referred to as cantilever beams.

In the illustrated embodiment, the spring frame 212 is a separate element that is configured to be attached to the housing insert 206. However, in alternative embodiments, a spring frame is not used and the housing insert 206 includes the various features of the spring frame 212 that are described herein. For example, the housing insert 206 may be molded to include the flex elements 241-248. Alternatively, the housing insert 206 may include one or more of the flex elements 241-248 and the spring frame 212 may include one or more of the remaining flex elements.

For each type of flex element (e.g., retaining latches, coupling latches, biasing fingers), the illustrated embodiment includes multiple flex elements. However, other embodiments may use more or fewer flex elements than the number shown in FIG. 5. For example, the spring frame 212 may include only a single retaining latch and/or only a single coupling latch and/or only a single biasing finger. The biasing fingers 247, 248 may be optional as well as the retaining latches 241, 242 and the coupling latches 243-246. In the illustrated embodiment, the spring frame 212 and the flex elements 241-248 are stamped from a continuous piece of sheet material and formed to include the various features described herein. However, in alternative embodiments, the spring frame 212 may be an assembly that includes separate structural parts that operate as described herein. For example, the spring frame may include top and bottom halves in which the bottom half includes the flex elements 242, 245, and 246 and the top half includes the flex elements 241, 243, and 244.

The frame body 240 wraps around and defines an insert-receiving volume 249 where the slidable connector 222 and, more specifically, the housing insert 206 may be inserted. The frame body 240 is configured to wrap at least partially around the housing insert 206. In FIG. 5, the frame body 240 is wrapped almost completely around the housing insert 206. The frame body 240 includes a first (or front) end 270 and a second (or back) end 272. As shown, the first end 270 may include a plurality of edges, and the second end 272 may include a single edge 258. A plurality of frame sides 251-254 are generally defined by a shape of the frame body 240. The frame sides 251-254 extend axially between the first and second ends 270, 272.

The flex elements 241-248 may be biased in predetermined positions. For example, the retaining latches 241, 242 are located along the opposite frame sides 251, 253 and extend away from the insert-receiving volume 249 (or the slidable connector 222 when the slidable connector 222 is located therein). Each of the retaining latches 241, 242 extend from a respective joint 256 that is proximate to the first end 270. The retaining latches 241, 242 extend toward the second end 272 and generally in the first direction $M_1$ at non-orthogonal angles with respect to the z-axis or the xz-plane. The non-orthogonal angles may be, for example, less than about 45° or less than about 30°. In more particular embodiments, the non-orthogonal angles may be less than about 20°. The retaining latches 241, 242 are configured to flex within a flex plane that extends parallel to the zy-plane. In alternative embodiments, the retaining latches 241, 242 may extend perpendicular to the z-axis.

The coupling latches 243, 244 are located along the frame side 251, and the coupling latches 245, 246 are located on the opposite side 253. Each of the coupling latches 243-246 extends generally away from the remainder of the frame body 240. The coupling latches 243, 244 extend away from each other, and the coupling latches 245, 246 extend away from each other. Moreover, each of the coupling latches 243-246 extends from a respective joint 260 that is proximate to the first end 270. The coupling latches 243-246 extend toward the second end 272 and generally in the first direction $M_1$ at non-orthogonal angles with respect to the zy-plane. The non-orthogonal angles may be, for example, less than about 60° or less than about 45°. In more particular embodiments, the non-orthogonal angles may be less than about 30°. However, in alternative embodiments, the angles could be orthogonal with respect to the z-axis. Also, in alternative embodiments, only a single coupling latch may be used.

Also shown, each of the coupling latches 243-246 includes a base segment 290 and a distal segment 292. The base segment 290 extends from the joint 260, and the distal segment 292 extends from the base segment 290. The distal segments 292 extend parallel to the central axis 202 (FIG. 4) in the illustrated embodiment. In an illustrated embodiment, the coupling latches 243-246 are configured to flex within a flex plane that extends parallel to the xz-plane. However, in alternative embodiments, the coupling latches 243-246 may flex within a flex plane that extends parallel to the zy-plane. Accordingly, the retaining latches 241, 242 and the coupling latches 243-246 may be configured to flex along different flex planes (e.g., xz- and zy-planes). The different flex planes are substantially orthogonal to each other. However, in other embodiments, the retaining latches 241, 242 and the coupling latches 243-246 may flex within the same plane.

The biasing fingers 247, 248 are located on the opposite sides 252, 254. In the illustrated embodiment, the biasing fingers 247, 248 extend into the insert-receiving volume 249. The biasing fingers 247, 248 include distal ends 287, 288 that are configured to engage the shutters 208, 210 (FIG. 4), respectively. In the illustrated embodiment, the distal ends 287, 288 are contoured to curve away from the central axis 202 or the insert-receiving volume 249. The biasing fingers 247, 248 may be preloaded in some embodiments such that a stored energy causes the corresponding biasing finger to press against the corresponding shutter throughout operation of the connector assembly 102.

Also shown, the spring frame 212 may include shutter grips 281-284 at the first end 270. The shutter grips 281-284 include contoured elements that are configured to engage the shutters 208, 210. The shutter grips 281-284 are configured to operate in conjunction with the biasing fingers 247, 248 to close the shutters 208, 210 as described in greater detail below.

Figure 6:
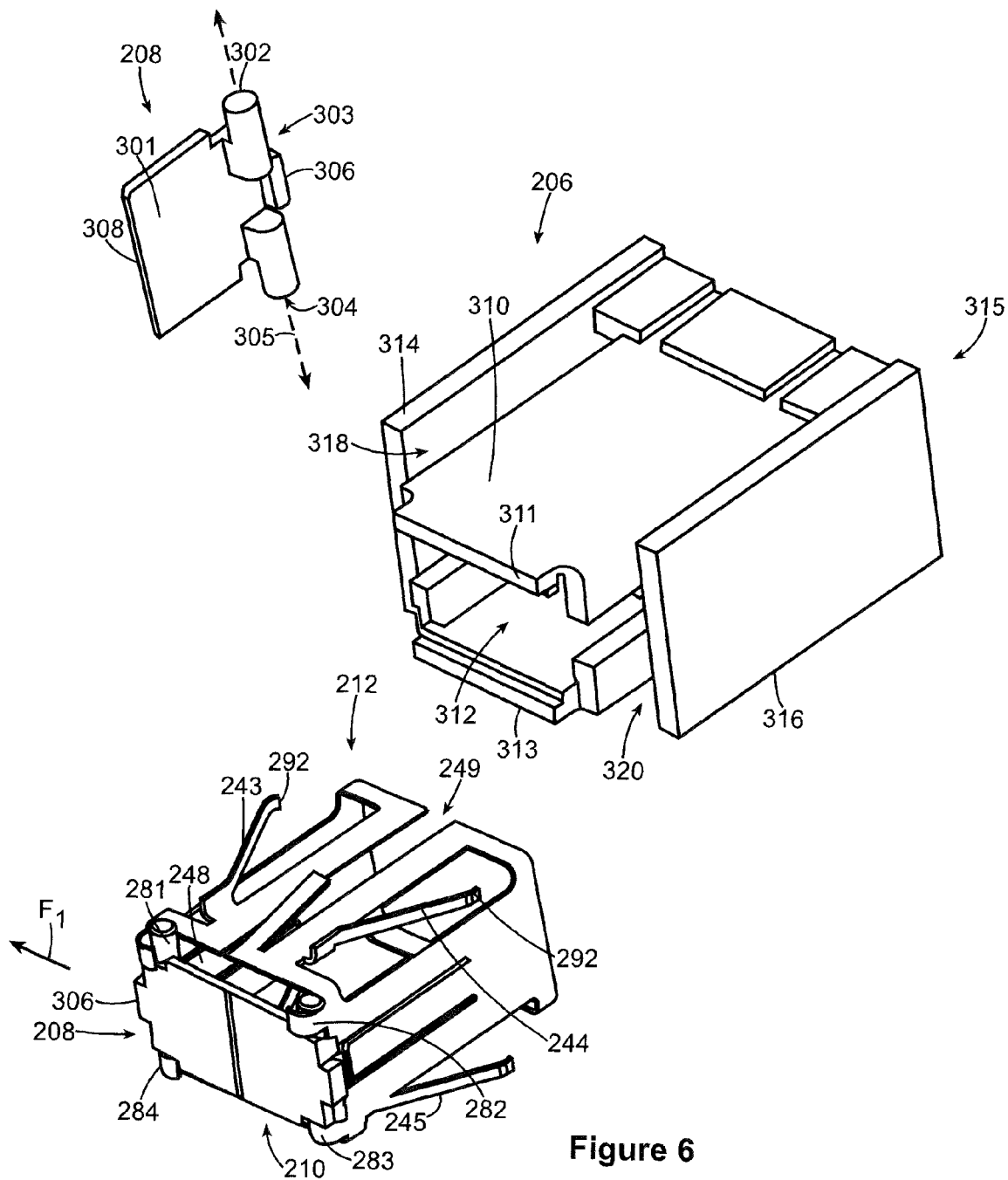
FIG. 6 illustrates isolated views of different components of the second connector assembly of FIG. 4.

FIG. 6 illustrates isolated views of the shutter 208, the spring frame 212 having the shutters 208, 210 operatively coupled thereto, and the housing insert 206. As shown with respect to the isolated view of the shutter 208, the shutter 208 includes a panel 301 that extends between first and second side edges 308, 303. The shutter 208 also includes a pair of rods 302, 304 and a shutter ledge 306 that are located proximate to the second side edge 303. The rods 302, 304 are aligned with each other along a rotational axis 305. In alternative embodiments, only a single rod is used. In the illustrated embodiment, the shutter ledge 306 includes an extension that projects laterally away from the side edge 303 in a direction that is perpendicular to the panel 301. The shutter 210 may have a similar configuration as the shutter 208.

As shown in the view of the spring frame 212, the shutter grips 281, 284 are mechanically coupled to the shutter 208, and the shutter grips 282, 283 are mechanically coupled to the shutter 210. More specifically, each of the shutter grips 281-284 is configured to grip a corresponding one of the rods 302, 304 and permit the corresponding shutter to rotate about the axis 305. The shutter ledge 306 is positioned between the rods 302, 304. Each of the shutter ledges is sized and shaped to be engaged by the corresponding distal end of the biasing finger. For example, the shutter ledge 306 of the shutter 208 is configured to be engaged by the distal end 288 (FIG. 5) of the biasing finger 248. When engaged, the biasing finger 248 provides an outward force $F_1$ that rotates the shutter 208 into a closed position as shown in FIG. 6. As such, the shutters 208, 210 are configured to be in closed positions prior to the mating operation.

The housing insert 206 includes a main portion 310 having a center cavity 312 and a pair of sidewalls 314, 316 located on opposite sides of the main portion 310. The main portion 310 has front edges 311, 313 that define an opening to the center cavity 312. The main portion 310 also includes a loading end 315 that includes an opening (not shown) to the center cavity 312. The center cavity 312 is configured to receive the insert plug 230 (FIG. 4). As shown, a lateral space 318 is located between the sidewall 314 and the main portion 310, and a lateral space 320 is located between the sidewall 316 and the main portion 310. The main portion 310 is sized and shaped to be advanced into the insert-receiving volume 249 of the spring frame 212. As will be described in greater detail below, the lateral spaces 318, 320 are sized and shaped to receive the projecting arms 144, 142 (FIG. 3), respectively, during the mating operation. In some embodiments, the distal segments 292 of the coupling latches 243, 246 (FIG. 5) extend into the lateral space 318, and the distal segments 292 of the coupling latches 244, 245 extend into the lateral space 320.

Figure 7:
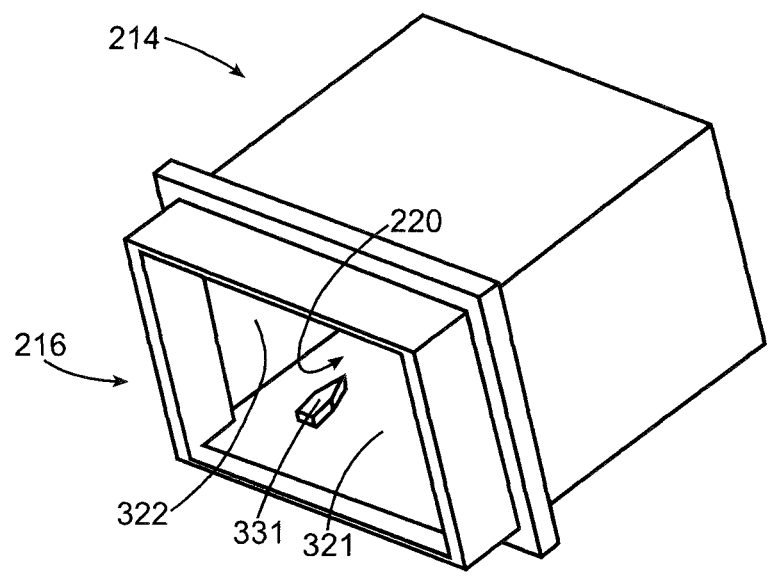
FIG. 7 is an isolated perspective view of an outer housing of the second connector assembly of FIG. 4.
Figure 8:
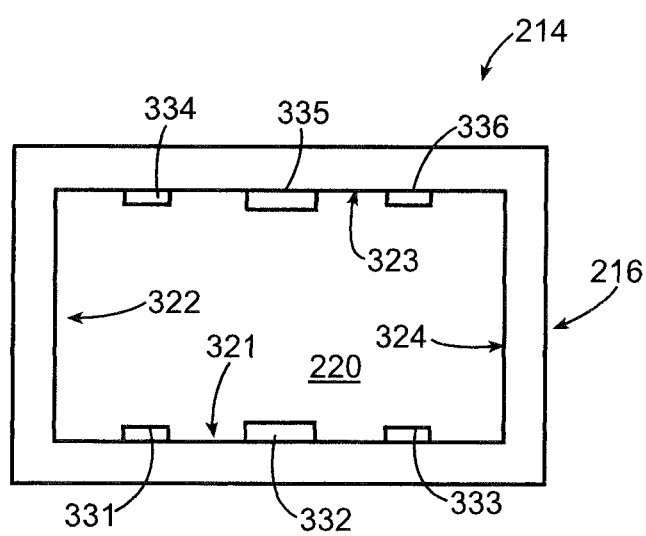
FIG. 8 is a front view of the outer housing of FIG. 7.

FIGS. 7 and 8 show a perspective view and a front view, respectively, of the outer housing 214. The outer housing 214 includes interior walls 321, 322 and interior walls 323, 324 (FIG. 8). The interior walls 321-324 may define the passage 220 and include corresponding surfaces configured to engage the spring frame 212 (FIG. 4) or the slidable connector 222 (FIG. 4). The interior walls 321 and 323 oppose each other with the passage 220 therebetween. The interior wall 321 includes reference elements 331-333, and the interior wall 323 includes reference elements 334-336. The reference elements 332-336 are only shown in FIG. 8.

In an exemplary embodiment, the reference elements 332, 335 are positioned at a greater axial depth from the front end 216 than the reference elements 331, 333, 334, and 336. The reference elements 331, 333, 334, and 336 may be located at a substantially equal axial depth. The reference elements 331-336 are configured to engage the flex elements 241-246 (FIG. 5) during mating and unmating operations between the first and second connector assemblies 101, 102 (FIG. 1) as will be described in greater detail below. More specifically, the reference elements 335, 332 are configured to engage the retaining latches 241, 242, respectively, and the reference elements 331, 333, 334, and 336 are configured to engage the coupling latches 246, 245, 243, 244, respectively.

Figure 9:
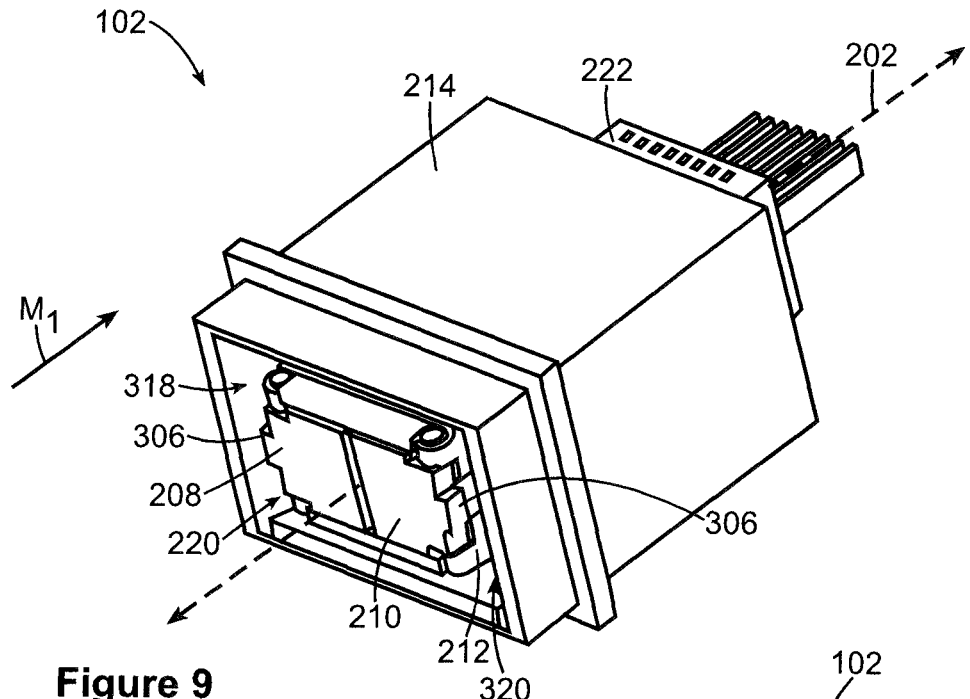
FIG. 9 is a perspective view of the second connector assembly prior to mating with the first connector assembly.

FIG. 9 is a perspective view of the fully constructed connector assembly 102. In FIG. 9, the connector assembly 102 has an unengaged configuration (or is in an unengaged state) that exists prior to mating with the connector assembly 101 (FIG. 1) through the mating operation. Prior to the mating operation, the spring frame 212 mechanically couples the slidable connector 222 with respect to the outer housing 214. For example, although not shown in detail, the retaining latches 241, 242 (FIG. 5) are engaged with the reference elements 335, 332 (FIG. 8), respectively, before the mating operation. The retaining latches 241, 242 are predisposed to extend away from the central axis 202 so that ends of the retaining latches 241, 242 are located in front of and pressed against the reference elements 335, 332, respectively. The reference elements 335, 332 function as positive stops that prevent the slidable connector 222 from moving in the first direction $M_1$. As such, the slidable connector 222 and the outer housing 214 are mechanically coupled to each other prior to the mating operation.

In the unengaged configuration, the shutters 208, 210 are in closed positions thereby preventing access to the communication modules 232 (FIG. 4) in the passage 220. The shutters 208, 210 may prevent dirt, dust, or other unwanted material from collecting on or near the communication modules 232. Such material may disrupt data signals or damage the communication modules 232. As shown, the shutter ledges 306 of the shutters 208, 210 project away from the central axis 202 and into the lateral spaces 318, 320.

Figure 10:
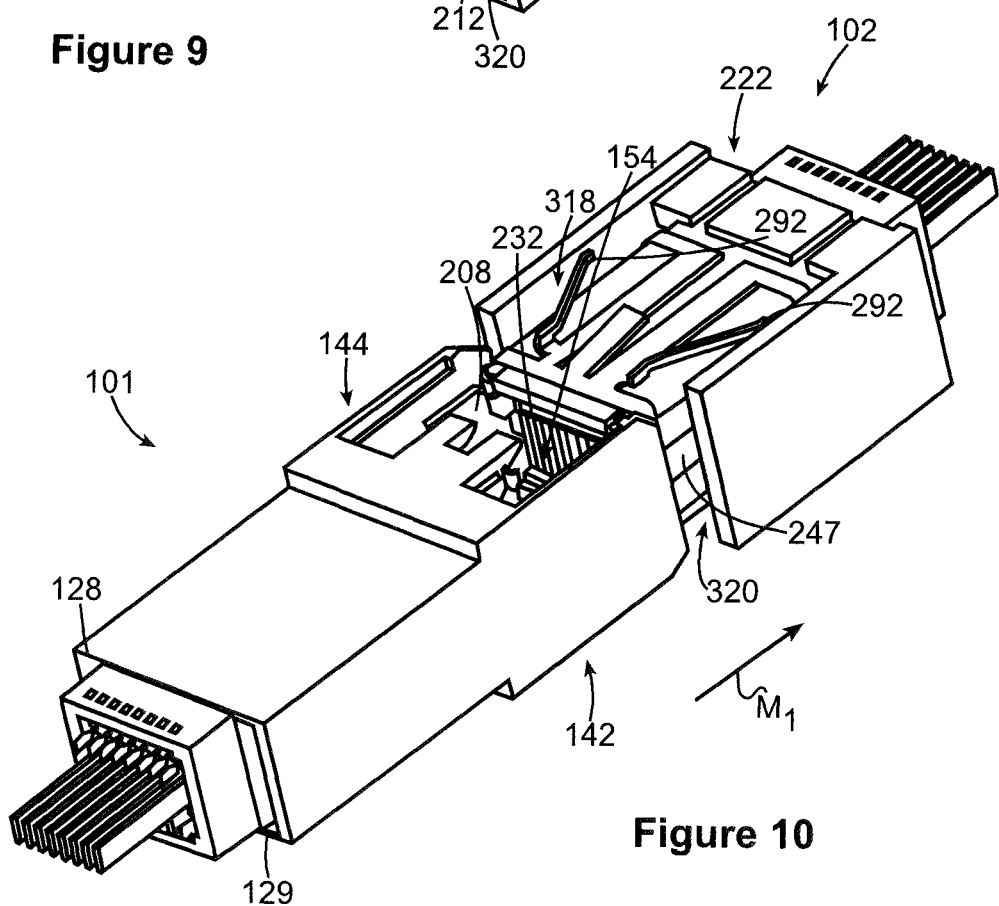
FIG. 10 illustrates a shutter-activation stage of a mating operation between the first and second connector assemblies.

For illustrative purposes in FIGS. 10-14, the outer housing 214 (see FIG. 4) has been removed. A mating operation to mate the connector assembly 101 and the connector assembly 102 with each other may include a sequence of stages. FIGS. 10 through 16 show examples of such stages, although additional stages may occur before, between, and/or after these exemplary stages. For example, FIG. 10 shows the connector assemblies 101, 102 at a first stage during the mating operation. The first stage may also be referred to as a shutter-activation stage. During the first stage, the projecting arms 144, 142 engage the shutter ledges 306 (FIG. 6) of the shutters 208, 210 (FIG. 6), respectively, thereby opening the shutters 208, 210. In the first stage, the communication modules 232 are exposed to the connector-receiving space 154 of the connector assembly 101.

When the shutters 208, 210 are in the closed positions, the projecting arms 142, 144 engage the shutter ledges 306 while moving in the first direction $M_1$. An axial force provided by the connector assembly 101 moving in the first direction $M_1$ is translated into a rotational force that rotates the shutters 208, 210 into the open positions shown in FIG. 10. The shutters 208, 210 rotate about the axis 305 (FIG. 6). When the shutters 208, 210 are rotated, the biasing fingers 247, 248 (FIG. 5) are deflected toward the slidable connector 222. In the deflected state, the biasing fingers 247, 248 have a stored potential energy that is configured to rotate the shutters 208, 210 back into the closed positions when the projecting arms 142, 144 are removed. In the illustrated embodiment, when the shutters 208, 210 are in open positions, the shutters 208, 210 may be received by the channels 128, 129, respectively, of the assembly housing 110. Also shown in FIG. 10, the distal segments 292 are located in the lateral spaces 318, 320.

In an exemplary embodiment, the projecting arms 144, 142 extend different lengths 150, 146 (FIG. 2) along the central axis 202 (FIG. 4). In such embodiments, the movement of the shutters 208, 210 may be staggered so that the shutters 208, 210 may suitably open and close. For example, in some embodiments, the side edges 308 (FIG. 6) of the shutters 208, 210 may be shaped to overlap each other. However, if the shutters 208, 210 were to close at the same time, then it may be possible that the shutters 208, 210 would engage each other thereby preventing the shutters 208, 210 from fully closing. Accordingly, the projecting anus 144, 142 may be configured to open the shutters 208, 210 at different times and/or to close the shutters 208, 210 at different times.

Figure 11:
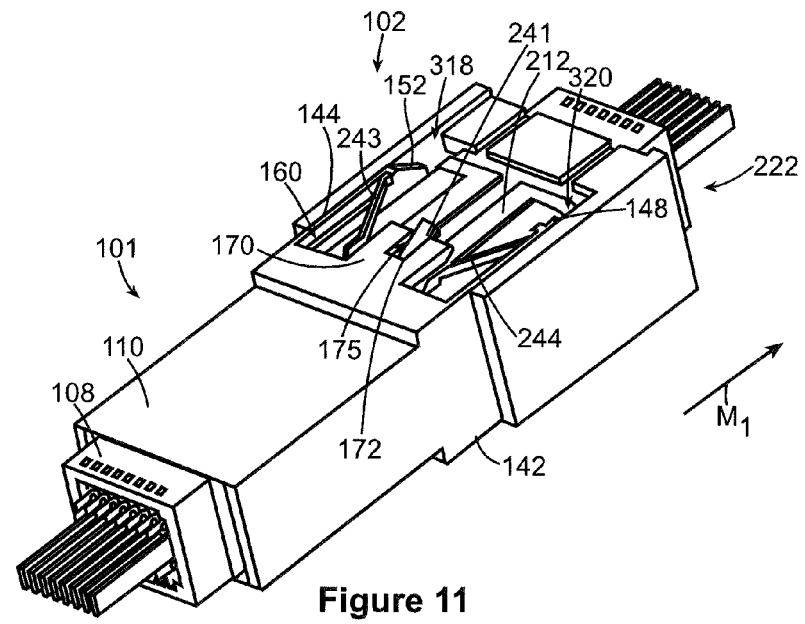
FIG. 11 illustrates a transition stage of the mating operation between the first and second connector assemblies.
Figure 12:
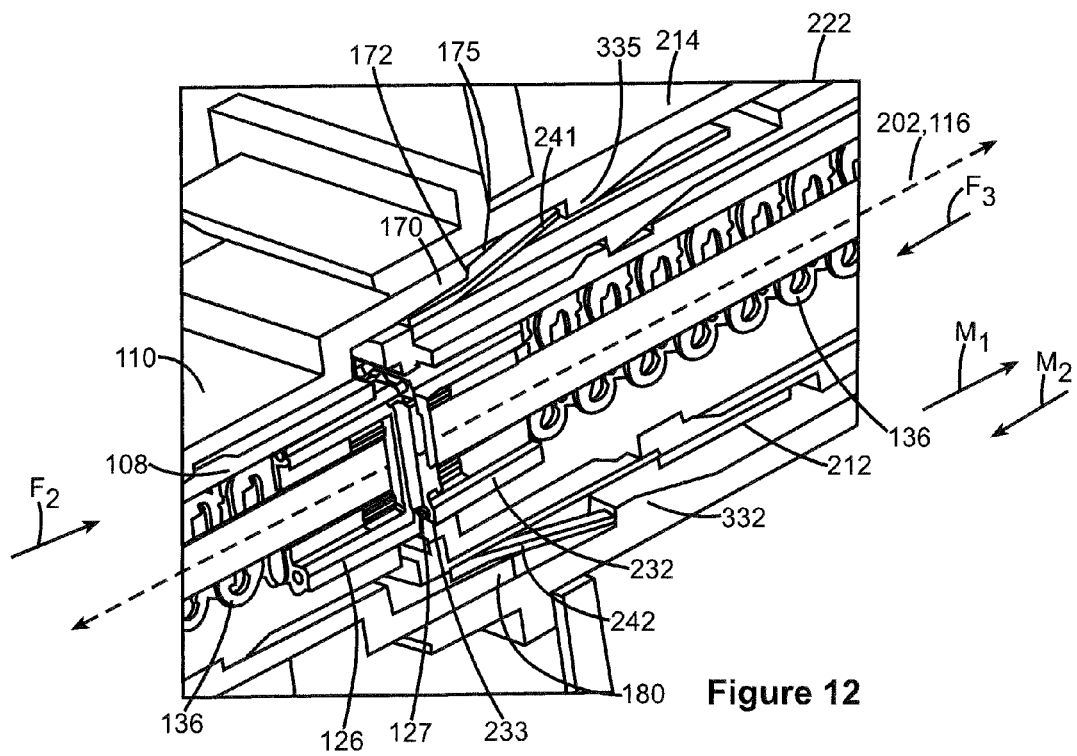
FIG. 12 is a perspective cross-sectional view of the first and second connector assemblies during the transition stage.

FIGS. 11 and 12 illustrate a second stage in the mating operation. The second stage may also be referred to as a transition stage. FIG. 11 is a perspective view of the connector assemblies 101, 102 with the outer housing 214 (FIG. 4) removed for illustrative purposes. FIG. 12 is a perspective view of a cross-section of the connector assemblies 101, 102 taken along the central axis 202. When the connector assemblies 101, 102 are mated, the central axis 202 and the central axis 116 may coincide as shown in FIG. 12. During the second stage, the slidable connector 222 is decoupled or released from the outer housing 214 and the slidable connector 222 is mechanically coupled to the connector assembly 101 or, more specifically, the assembly housing 110. Accordingly, during the second stage, the slidable connector 222 transitions from being coupled to the outer housing 214 to being coupled to the connector assembly 101. In the illustrated embodiment, the releasing of the slidable connector 222 from the outer housing 214 occurs after the coupling of the slidable connector 222 to the assembly housing 110. However, in other embodiments, the releasing of the slidable connector 222 from the outer housing 214 may occur at substantially the same time as the coupling of the slidable connector 222 to the assembly housing 110.

With respect to FIG. 11, during the second stage, the projecting arms 144, 142 are advanced into the lateral spaces 318, 320, respectively, and are configured to interact with the spring frame 212. For example, as the projecting aim 144 moves in the first direction $M_1$, the leading edge 152 engages the coupling latches 243, 246 (FIG. 5). The coupling latches 243, 246 are deflected inward (e.g., generally toward or closer to the slidable connector 222) until the coupling latches 243, 246 clear the leading edge 152. The coupling latches 243, 246 then flex or resile into the grooves 160, 162 (FIG. 3). The coupling latches 244, 245 (FIG. 5) may also interact with the leading edge 148 of the projecting arm 142 in the same manner. In some embodiments, while the coupling latches 243-246 are being deflected by the projecting arms 144, 142, the retaining latches 241, 242 are being engaged by the actuators 170, 180, respectively.

For example, as shown in FIG. 12, the actuator 170 is configured to engage and deflect the retaining latch 241. As the assembly housing 110 slides in the first direction $M_1$, the retaining latch 241 is received within the notch 175 defined between the projections 174, 176. The actuator edge 172 engages the retaining latch 241 in the notch 175 thereby deflecting the retaining latch 241 toward the slidable connector 222. When the retaining latch 241 is deflected, the retaining latch 241 is disengaged from the reference element 335. In a similar manner, the retaining latch 242 may be disengaged from the reference element 332 by the actuator 180. When the retaining latches 241, 242 are no longer engaged to the reference elements 335, 332, the slidable connector 222 is permitted to be moved by the connector assembly 101 in the first direction $M_1$. More specifically, the slidable connector 222 is permitted to move independently of the outer housing 214.

As shown in FIG. 12, the communication modules 126 and 232 engage such that the communication modules 126 and 232 are communicatively coupled before the slidable connector 222 is released from the outer housing 214. Each of the communication modules 126 has at least one of the guide pins 127, and each of the communication modules 232 has at least one cavity 233 that is configured to receive a corresponding guide pin. The guide pins 127 are inserted into corresponding cavities 233 of the communication modules 232. When the module and slidable connectors 110, 222 are mated, each of the communication modules 126 is individually aligned with a corresponding one of the communication modules 232.

As the communication modules 126 and 232 engage each other, the corresponding biasing elements 136 are compressed thereby increasing the stored potential energy of the biasing elements 136. The biasing elements 136 of the module connector 108 collectively provide a resilient force $F_2$ in the first direction $M_1$, and the biasing elements 136 of the slidable connector 222 collectively provide a resilient force $F_3$ in the second direction $M_2$. The opposing resilient forces $F_2$, $F_3$ may facilitate maintaining the communicative coupling between the communication modules 126, 232 throughout the lifetime operation of the connector assemblies 101, 102. However, in other embodiments, only one of the connector assemblies 101, 102 includes biasing elements or, alternatively, neither of the connector assemblies 101, 102 include biasing elements.

Figure 13:
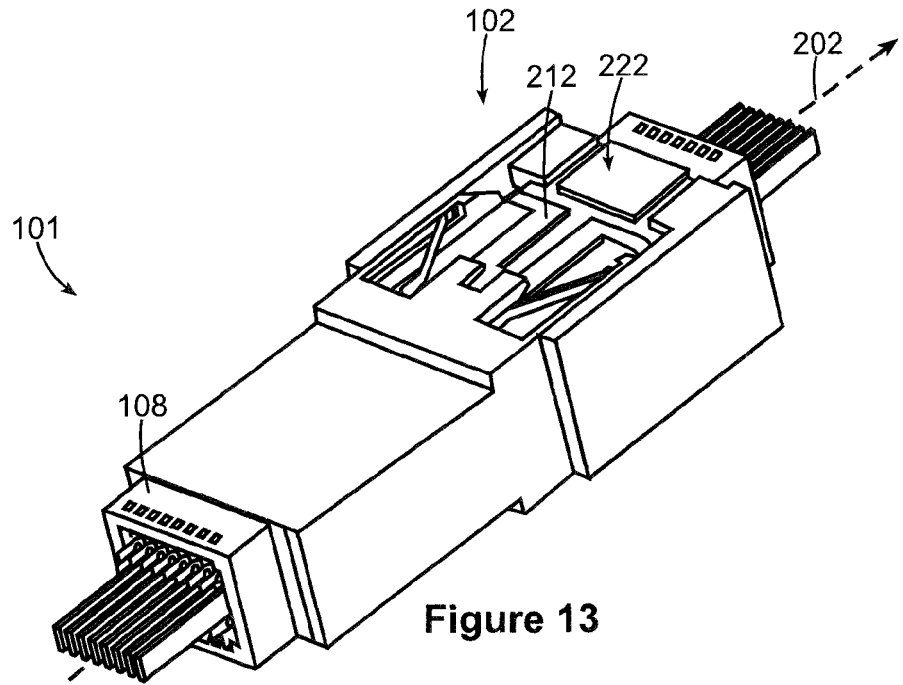
FIG. 13 illustrates the first and second connector assemblies during a z-travel stage in which the outer housing of the second connector assembly has been removed.
Figure 14:
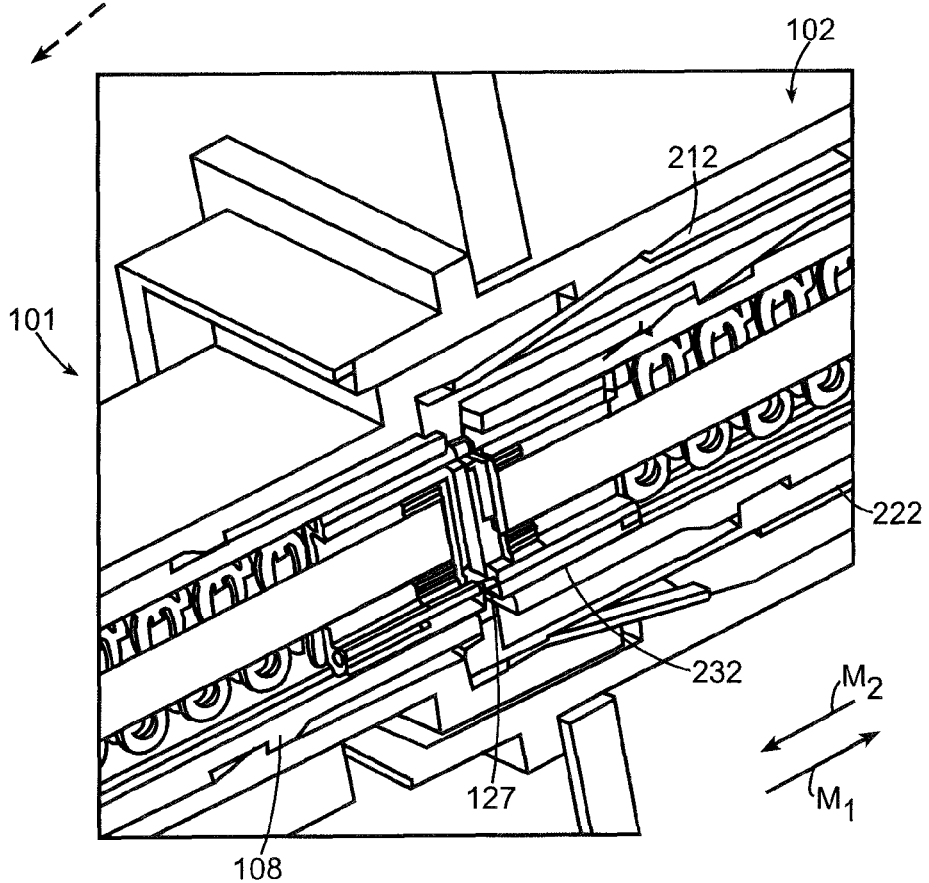
FIG. 14 is a perspective cross-sectional view of the first and second connector assemblies during the z-travel stage.
Figure 15:
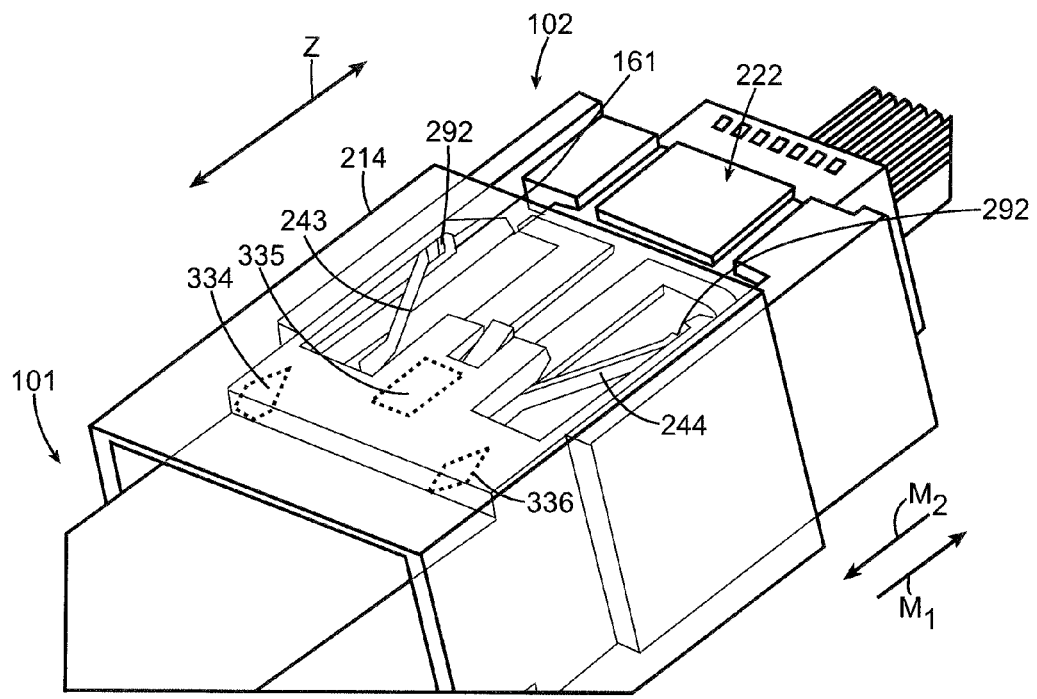
FIG. 15 is a perspective view of the first and second connector assemblies during the z-travel stage wherein the outer housing of the second connector assembly is shown in phantom.
Figure 16:
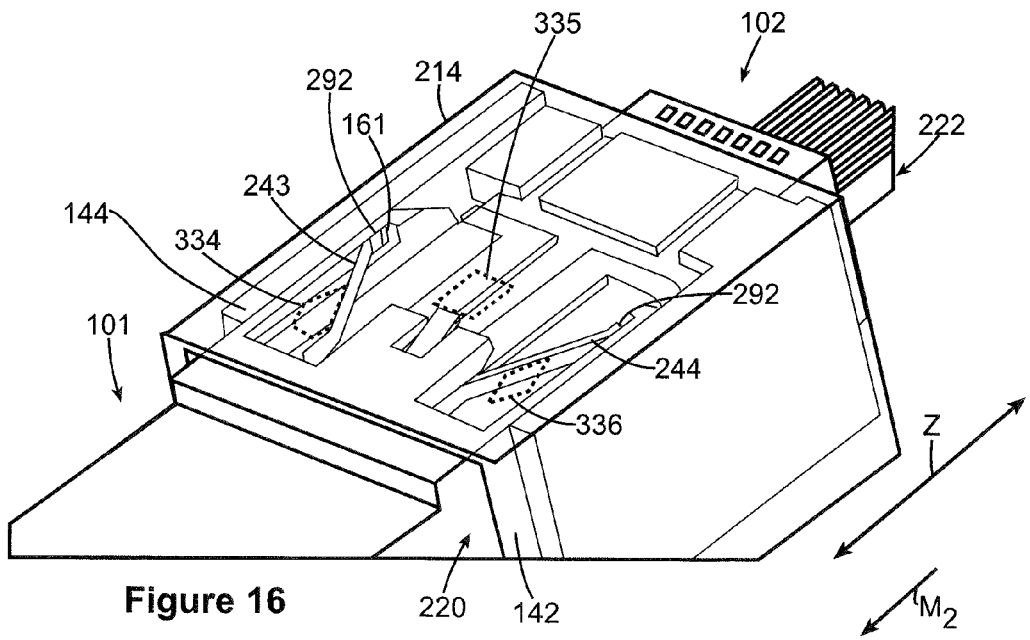
FIG. 16 is another perspective view of the first and second connector assemblies during the z-travel stage wherein the outer housing of the second connector assembly is shown in phantom.

FIGS. 13-16 show the connector assemblies 101, 102 during a third or z-travel stage. During the third stage, the module connector 110 and the slidable connector 222 are communicatively and mechanically coupled to each other and are capable of moving along the central axis 202 (FIG. 12) independent of the outer housing 214 (FIGS. 15 and 16). In FIG. 13, the outer housing 214 (FIG. 4) has been removed. The module connector 110 and the slidable connector 222 may be mechanically coupled together through the spring frame 212 and other frictional forces, such as the frictional forces caused by the guide pins 127 (FIG. 14) coupled to the communication modules 232 (FIG. 14). As such, the module and slidable connectors 108, 222 are movable bi-directionally along the central axis 202 for a designated axial distance, which may also be referred to as a travel distance or z-travel. Accordingly, after the module and slidable connectors 108, 222 are mated (e.g., mechanically and electrically coupled), the module and slidable connectors 108, 222 may have substantially stationary (or fixed) positions with respect to each other and be moved in either the first direction $M_1$ or the second direction $M_2$.

FIGS. 15 and 16 also show the connector assemblies 101, 102 during the third stage at different positions with respect to the outer housing 214. For reference, the outer housing 214 is shown in phantom for FIGS. 15 and 16. In the illustrated embodiment, the z-travel is measured from a point in which the connector assembly 102 is stopped from traveling in the first direction $M_1$ to a point in which the connector assemblies 101, 102 are unmated (e.g., when the communication modules 126 (FIG. 2), 232 (FIG. 4) are disengaged from each other and the module and slidable connectors 108, 222 are no longer mechanically coupled). In some embodiments, the z-travel may be at least about 1 millimeter (mm) or at least about 2 mm. In particular embodiments, the z-travel may be at least about 3 mm or, more particularly, at least about 4 mm. The z-travel may be less than about 5 mm or, more particularly, less than about 10 mm. In other embodiments, the z-travel can be even greater (e.g., at least about 1 centimeter, 2 centimeters, or more).

The reference elements 334-336 are indicated in FIGS. 15 and 16 by dashed lines. If the connector assembly 101 is moved in the second direction $M_2$ (e.g., if the connector assembly 101 is pulled in the second direction $M_2$), the distal segments 292 of the coupling latches 243, 244 press against the engagement surfaces 161 thereby preventing the connector assembly 101 from being prematurely or inadvertently disengaged from the connector assembly 102. The module and slidable connectors 108 (FIG. 2), 222 remain mechanically and communicatively coupled to each other as the module and slidable connectors 108, 222 slide in the second direction $M_2$ from the point shown in FIG. 15 to the point shown in FIG. 16.

With respect to FIG. 16, as the connector assembly 101 is pulled in the second direction $M_2$, the retaining latch 241 may be deflected by and clear the reference element 335 and return to a relaxed condition (or more relaxed condition) in front of the reference element 335. Before, after, or at substantially the same time, the coupling latches 243, 244 may be deflected inward toward each other by the reference elements 334, 336, respectively. When the coupling latches 243, 244 are deflected, the distal segments 292 of the coupling latches 243, 244 are disengaged from the projecting arms 144, 142, respectively. At this time, the projecting arms 144, 142 are permitted to continue moving in the second direction $M_2$ and clear the distal segments 292 of the coupling latches 243, 244, respectively. In the illustrated embodiment, as the connector assembly 101 continues to move in the second direction $M_2$, the communication modules 126 (FIG. 2), 232 (FIG. 4) are disengaged from each other and the connector assembly 101 is removed from the passage 220 of the outer housing 214. When the projecting arms 144, 142 are removed, the shutters 208, 210 are rotated back to closed positions. As described above, the projecting arms 144, 142 may be configured so that the shutters 208, 210 are closed at different times.

Figure 17:
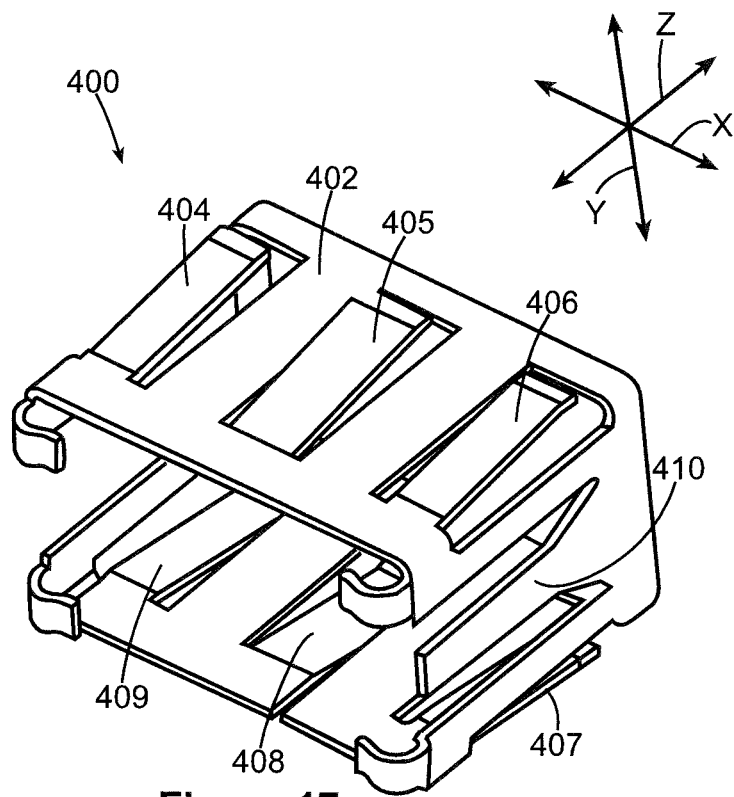
FIG. 17 is a perspective view of a spring frame formed in accordance with one embodiment.
Figure 18:
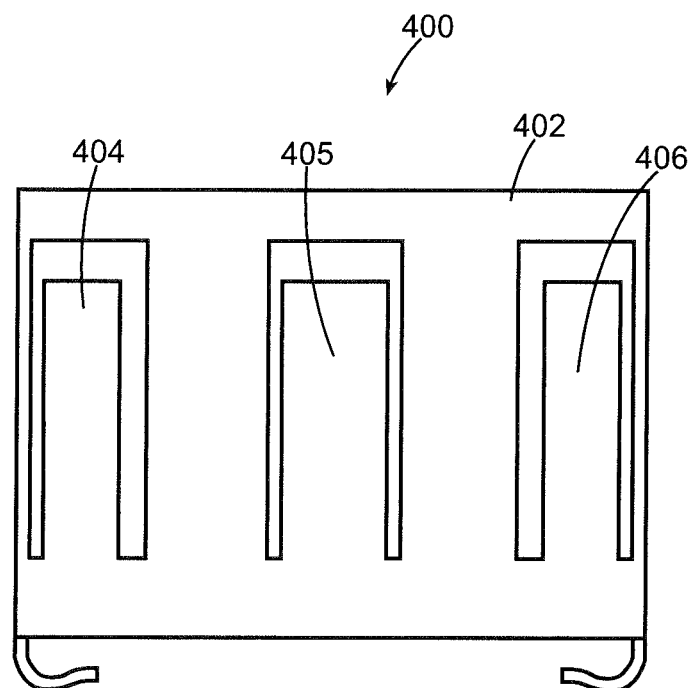
FIG. 18 is a top view of the spring frame of FIG. 17.

FIG. 17 is a perspective view of a spring frame 400, and FIG. 18 is a top view of the spring frame 400. The spring frame 400 may be similar to the spring frame 212 (FIG. 4). For example, the spring frame 400 may include a frame body 402 having a plurality of resilient flex elements 404-410. The frame body 402 is configured to wrap around a portion of a housing insert (not shown), such as the housing insert 206 (FIG. 4), so that the spring frame 400 is disposed between the housing insert and an outer housing (not shown) of a connector assembly (not shown). The flex elements 404-410 may operate in a similar manner as the flex elements 241-248 (FIG. 5). The flex elements 404-410 include retaining latches 405, 408, coupling latches 404, 406, 407, and 409, and a biasing finger 410. The retaining latches 405, 408 may engage the outer housing in a similar manner as the retaining latches 241, 242 (FIG. 5). The coupling latches 404, 406, 407, and 409 may operate in a similar manner as the coupling latches 243-246 (FIG. 5). As shown in FIG. 17, the flex elements 404-409 are configured to flex in a common direction, such as along a zy-plane. In the illustrated embodiment, the spring frame 400 includes only a single biasing finger 410. Alternatively, a plurality of biasing fingers may be used. For example, another biasing finger may be located opposite the biasing finger 410 in FIG. 17.

Figure 19:
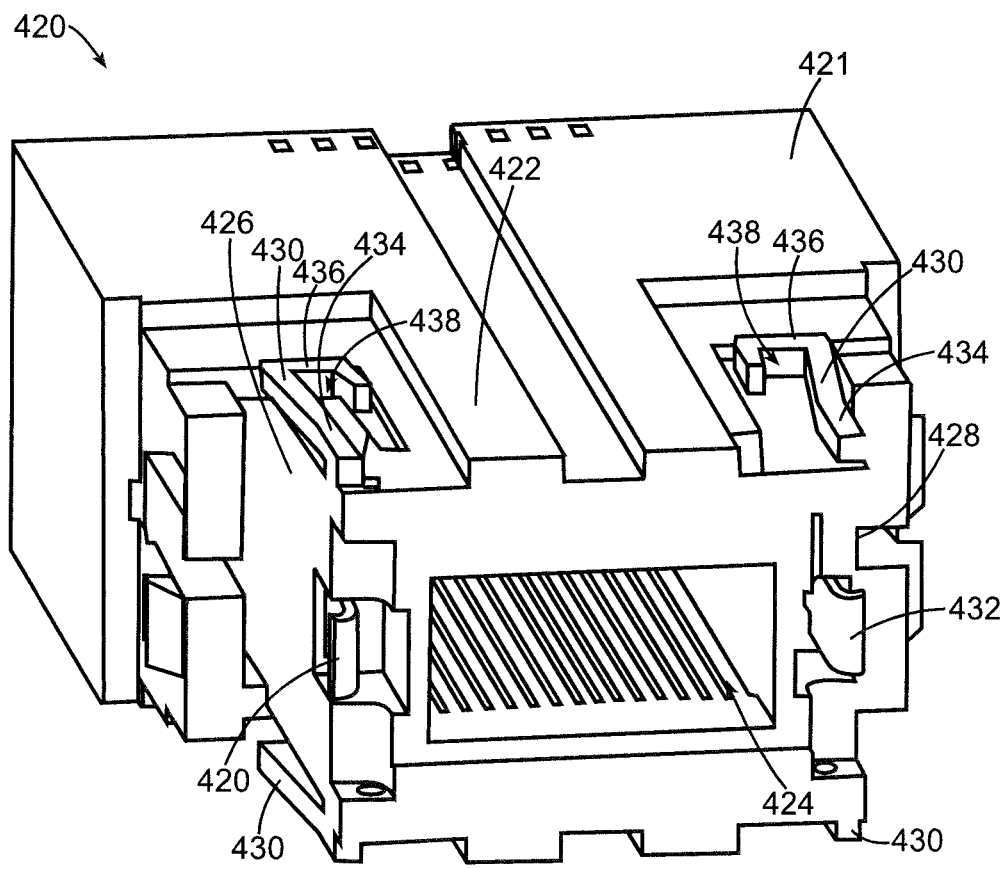
FIG. 19 is a perspective view of a housing insert formed in accordance with one embodiment.

FIG. 19 is a perspective view of a housing insert 420. The housing insert 420 may comprise a body 421 that is molded to have the features described herein. For example, the housing insert 420 includes a main portion 422 having a center cavity 424 and a pair of sidewalls 426, 428 located on opposite sides of the main portion 422. The center cavity 424 is configured to receive a plurality of communication modules (not shown), such as the communication modules 232 (FIG. 4) and/or an insert plug (not shown), such as the insert plug 230 (FIG. 4), that is configured to hold the communication modules.

The housing insert 420 may be configured to include features that are similar to the features of the spring frames 212 and 400 described above, such as retaining latches, coupling latches, and/or biasing fingers. In the illustrated embodiment, the housing insert 420 includes one or more coupling latches 430 that are configured to operate in a similar manner as the coupling latches 243-246 (FIG. 5).

In an exemplary embodiment, the coupling latches 430 are molded with the body 421. The coupling latches 430 may extend from proximate an opening to the center cavity 424. As shown, the coupling latches 430 include a base segment 434 and a distal segment 436. The base segment 434 is angled such that the coupling latch 430 clears the corresponding sidewall. The distal segment 436 may be shaped to include a recess 438. The recess 438 is configured to receive a reference element (not shown) of an outer housing (not shown), such as the outer housing 214 (FIG. 4). For example, the distal segment 436 may be hook-shaped or C-shaped and thereby defining the recess 438 that receives the reference element. In the illustrated embodiment, the coupling latches 430 are deflected toward each other (or toward the main portion 422) by an assembly housing during a mating operation.

The housing insert 420 also includes biasing fingers 432. The biasing fingers 432 are molded into the main portion 422 of the body 421. For example, the biasing fingers 432 may comprise metal or other material. The biasing fingers 432 are configured to engage corresponding shutters (not shown) as described above with respect to the biasing fingers 247, 248.

In one embodiment, a connector assembly is provided that includes an outer housing having a front end, a back end, and a central axis extending therebetween. The outer housing has a passage that extends therethrough. The connector assembly also includes a slidable connector that is disposed within the passage. The slidable connector includes a communication module for communicatively coupling to a mating connector during a mating operation to transmit at least one of data signals or power. The connector assembly also includes a spring frame that is positioned between the slidable connector and the outer housing. Prior to the mating operation, the spring frame mechanically couples the slidable connector with respect to the outer housing. After the mating connector and the slidable connector are engaged, the spring frame releases the slidable connector from the outer housing such that the slidable connector is permitted to move relative to the outer housing. The spring frame mechanically couples the slidable connector relative to the mating connector.

In one aspect, the spring frame may include a retaining latch that mechanically couples the slidable connector with respect to the outer housing. The retaining latch may be configured to be engaged by the mating connector during the mating operation to release the slidable connector.

In another aspect, the spring frame may include a coupling latch that mechanically couples the slidable connector relative to the mating connector. The coupling latch is configured to flex relative to the slidable connector when a projecting arm of the mating connector engages the coupling latch while moving in a first direction. After the projecting arm is permitted to pass the coupling latch, the coupling latch is configured to engage the projecting arm when the mating connector is pulled in a second direction that is opposite the first direction. The projecting arm mechanically couples the slidable connector relative to the mating connector.

In one aspect, the communication module is configured to move in a first direction when engaged by the mating connector. The slidable connector also includes a biasing element that is engaged to the communication module. The biasing element provides a resilient force against the communication module that resists movement in the first direction.

In one aspect, the slidable connector includes an insert plug that holds the communication module and the biasing element. The communication module is movable with respect to the insert plug.

In one aspect, the biasing element and the communication module constitute a module assembly. The slidable connector includes a plurality of the module assemblies. Each of the communication modules of the different module assemblies is independently movable with respect to the other communication modules.

In one aspect, the spring frame releases the slidable connector after the communication module is engaged by the mating connector.

In one aspect, the slidable connector is permitted to slide at least 3 millimeters in a direction along the central axis when the slidable connector is mechanically coupled to the mating connector.

In another embodiment, a connector assembly is provided that includes an outer housing having a front end, a back end, and a central axis extending therebetween. The outer housing has a passage that extends therethrough. The connector assembly also includes a slidable connector that is disposed within the passage. The slidable connector includes a communication module for communicatively coupling to a mating connector during a mating operation to transmit at least one of data signals or power. The connector assembly also includes a retaining latch that is positioned between the slidable connector and the outer housing. Prior to the mating operation, the retaining latch mechanically couples the slidable connector to the outer housing to prevent movement of the slidable connector in a first direction along the central axis. During the mating operation, the retaining latch is engaged by the mating connector thereby releasing the slidable connector from the outer housing. The slidable connector is permitted to move along the central axis within the passage during the mating operation.

In one aspect, the connector assembly also includes a coupling latch positioned between the slidable connector and the outer housing. The coupling latch is configured to mechanically couple the slidable connector and the mating connector to each other during the mating operation.

In one aspect, the connector assembly also includes a spring frame that has the retaining and coupling latches. The spring frame is a separate component with respect to the slidable connector.

In one aspect, the retaining and coupling latches extend at non-orthogonal angles with respect to the central axis in directions that are generally in the first direction.

In one aspect, the retaining and coupling latches are configured to flex along different flex planes. The different flex planes are substantially orthogonal to each other.

In one aspect, the slidable connector is permitted to slide at least 3 millimeters in a direction along the central axis when the slidable connector is mechanically coupled to the mating connector.

In one aspect, the slidable connector includes a housing insert. The housing insert includes the retaining latch.

In one aspect, the communication module is configured to move in the first direction when engaged by the mating connector. The slidable connector also includes a biasing element that is engaged to the communication module. The biasing element provides a resilient force against the communication module that resists movement in the first direction.

In one embodiment, a connector assembly is provided that includes an outer housing having a front end, a back end, and a central axis extending therebetween. The outer housing has a passage that extends therethrough. The connector assembly also includes a slidable connector that is disposed within the passage. The slidable connector includes a communication module for communicatively coupling to a mating connector during a mating operation to transmit at least one of data signals or power. The connector assembly also includes a coupling latch that is attached to the slidable connector and positioned in the passage between the slidable connector and the outer housing. The coupling latch is configured to flex relative to the slidable connector when a projecting arm of the mating connector engages the coupling latch while moving in a first direction. After the projecting arm is permitted to pass the coupling latch, the coupling latch is configured to engage the projecting arm when the mating connector is pulled in a direction that is opposite the first direction. The coupling latch is configured to hold the slidable connector in a stationary position relative to the mating connector.

In one aspect, the connector assembly also includes a retaining latch positioned between the slidable connector and the outer housing. Prior to the mating operation, the retaining latch mechanically couples the slidable connector to the outer housing to prevent movement of the slidable connector in the first direction. During the mating operation, the retaining latch is engaged by the mating connector thereby releasing the slidable connector from the outer housing.

In one aspect, the slidable connector is permitted to slide at least 3 millimeters in a direction along the central axis when the slidable connector is mechanically coupled to the mating connector.

In one aspect, the slidable connector includes a housing insert. The housing insert includes the coupling latch.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
   an outer housing having a front end, a back end, and a central axis extending therebetween, the outer housing having a passage extending therethrough;
   a slidable connector disposed within the passage, the slidable connector including a communication module for communicatively coupling to a mating connector during a mating operation to transmit at least one of data signals or power; and
   a spring frame positioned in the passage between the slidable connector and the outer housing, wherein prior to the mating operation, the spring frame mechanically couples the slidable connector with respect to the outer housing, and wherein, after the mating connector and the slidable connector engage each other, the spring frame releases the slidable connector from the outer housing such that the slidable connector is permitted to move relative to the outer housing, the spring frame being secured to the slidable connector such that the spring frame moves with the slidable connector as the slidable connector moves relative to the outer housing, the spring frame configured to mechanically couple the slidable connector relative to the mating connector during the mating operation.

2. The connector assembly of claim 1, wherein the spring frame includes a retaining latch that mechanically couples the slidable connector with respect to the outer housing, the retaining latch being biased to extend away from the slidable connector prior to the mating operation, the retaining latch configured to be deflected toward the slidable connector when engaged by the mating connector during the mating operation to release the slidable connector from the outer housing.

3. The connector assembly of claim 1, wherein the spring frame includes a coupling latch that mechanically couples the slidable connector relative to the mating connector, the coupling latch biased to extend generally away from the slidable connector prior to the mating operation, wherein the coupling latch is configured to be deflected generally toward the slidable connector when a projecting arm of the mating connector engages the coupling latch while moving in a first direction, and wherein, after the projecting arm is permitted to pass the coupling latch, the coupling latch is configured to engage the projecting arm when the mating connector is pulled in a second direction that is opposite the first direction thereby mechanically coupling the slidable connector relative to the mating connector.

4. The connector assembly of claim 1, wherein the communication module is configured to move in a first direction when engaged by the mating connector, the slidable connector also including a biasing element that is engaged to the communication module, the biasing element providing a resilient force against the communication module that resists movement in the first direction.

5. The connector assembly of claim 4, wherein the biasing element and the communication module constitute a module assembly, the slidable connector including a plurality of the module assemblies, each of the communication modules of the corresponding module assemblies being independently movable with respect to the other communication modules.

6. The connector assembly of claim 1, wherein the slidable connector is permitted to slide at least 3 millimeters in a direction along the central axis when the slidable connector is mechanically coupled to the mating connector.

7. The connector assembly of claim 1, wherein the spring frame is stamped-and-formed from a sheet of material, the spring frame including at least one flex element that is biased in a predetermined position and configured to be deflected to a deflected position, the flex element configured to engage the outer housing when in the predetermined position.

8. A connector assembly comprising:
   an outer housing having a front end, a back end, and a central axis extending therebetween, the outer housing having a passage extending therethrough;
   a slidable connector configured to be disposed within the passage, the slidable connector including a communication module for communicatively coupling to a mating connector during a mating operation to transmit at least one of data signals or power; and
   a retaining latch positioned between the slidable connector and the outer housing, wherein, prior to the mating operation, the retaining latch mechanically couples the slidable connector to the outer housing to prevent movement of the slidable connector in a first direction along the central axis, and wherein, during the mating operation, the retaining latch is engaged by the mating connector thereby releasing the slidable connector from the outer housing, the slidable connector being permitted to move along the central axis within the passage during the mating operation when the slidable connector is released from the outer housing, the retaining latch being secured to the slidable connector such that the retaining latch moves with the slidable connector as the slidable connector moves along the central axis relative to the outer housing.

9. The connector assembly of claim 8, further comprising a coupling latch positioned between the slidable connector and the outer housing, the coupling latch configured to mechanically couple the slidable connector and the mating connector to each other during the mating operation.

10. The connector assembly of claim 9, wherein the outer housing includes a reference element that engages the retaining latch and a reference element that engages the coupling latch.

11. The connector assembly of claim 9, further comprising a spring frame that has the retaining and coupling latches, the spring frame being a separate component with respect to the slidable connector, the spring frame being secured to the slidable connector such that the spring frame moves with the slidable connector as the slidable connector moves along the central axis.

12. The connector assembly of claim 8, wherein the slidable connector is permitted to slide at least 3 millimeters in a direction along the central axis when the slidable connector is mechanically coupled to the mating connector.

13. The connector assembly of claim 8, wherein the slidable connector includes a housing insert, the housing insert including the retaining latch.

14. The connector assembly of claim 8, wherein the communication module is configured to move in the first direction when engaged by the mating connector, the slidable connector also including a biasing element that is engaged to the communication module, the biasing element providing a resilient force against the communication module that resists movement in the first direction.

15. The connector assembly of claim 8, wherein the retaining latch is biased to extend away from the slidable connector prior to the mating operation, the retaining latch configured to be deflected toward the slidable connector when engaged by the mating connector.

16. A connector assembly comprising:
   an outer housing having a front end, a back end, and a central axis extending therebetween, the outer housing having a passage extending therethrough;
   a slidable connector disposed within the passage and configured to move relative to the outer housing, the slidable connector including a communication module for communicatively coupling to a mating connector during a mating operation to transmit at least one of data signals or power; and
   a coupling latch secured to the slidable connector such that the coupling latch moves with the slidable connector as the slidable connector moves relative to the outer housing, the coupling latch being positioned in the passage between the slidable connector and the outer housing, wherein the coupling latch is configured to flex relative to the slidable connector when a projecting arm of the mating connector engages the coupling latch while moving in a first direction, and wherein, after the projecting arm is permitted to pass the coupling latch, the coupling latch is configured to engage the projecting arm when the mating connector is pulled in a second direction that is opposite the first direction, the coupling latch configured to hold the slidable connector in a stationary position relative to the mating connector.

17. The connector assembly of claim 16, further comprising a retaining latch positioned between the slidable connector and the outer housing, wherein, prior to the mating operation, the retaining latch mechanically couples the slidable connector to the outer housing to prevent movement of the slidable connector in the first direction, and wherein, during the mating operation, the retaining latch is engaged by the mating connector thereby releasing the slidable connector from the outer housing.

18. The connector assembly of claim 17, further comprising a spring frame that has the retaining and coupling latches, the spring frame being a separate component with respect to the slidable connector, the spring frame being secured to the slidable connector such that the spring frame moves with the slidable connector as the slidable connector moves along the central axis.

19. The connector assembly of claim 16, wherein the slidable connector includes a housing insert, the housing insert including the coupling latch.

20. The connector assembly of claim 16, wherein the coupling latch is biased to extend generally away from the slidable connector prior to the mating operation, the coupling latch configured to be deflected generally toward the slidable connector when engaged by the mating connector.

\* \* \* \* \*